United States Patent
Cheng et al.

(10) Patent No.: US 8,970,483 B2
(45) Date of Patent: Mar. 3, 2015

(54) METHOD AND APPARATUS FOR DETERMINING INPUT

(75) Inventors: Youlong Cheng, Beijing (CN); Xiaohui Xie, Beijing (CN); Kongqiao Wang, Helsinki (FI)

(73) Assignee: Nokia Corporation, Espoo (FI)

( * ) Notice: Subject to any disclaimer, the term of this patent is extended or adjusted under 35 U.S.C. 154(b) by 137 days.

(21) Appl. No.: 13/703,204

(22) PCT Filed: Jun. 17, 2010

(86) PCT No.: PCT/CN2010/074001
§ 371 (c)(1),
(2), (4) Date: Dec. 10, 2012

(87) PCT Pub. No.: WO2011/156957
PCT Pub. Date: Dec. 22, 2011

(65) Prior Publication Data
US 2013/0076622 A1      Mar. 28, 2013

(51) Int. Cl.
*G09G 5/00*     (2006.01)
*H04N 5/225*    (2006.01)
*G06F 3/01*     (2006.01)

(52) U.S. Cl.
CPC .................................... *G06F 3/017* (2013.01)
USPC ......................................... 345/156; 348/169

(58) Field of Classification Search
USPC ......................................................... 345/156
See application file for complete search history.

(56) References Cited

U.S. PATENT DOCUMENTS

2010/0091110 A1*   4/2010   Hildreth ...................... 348/169

FOREIGN PATENT DOCUMENTS

| CN | 101183276 A | 5/2008 |
| CN | 101566914 A | 10/2009 |

OTHER PUBLICATIONS

International Search Report and Written Opinion received in Patent Cooperation Treaty Application No. PCT/CN2010/074001, dated Mar. 31, 2011, 9 pages.

* cited by examiner

*Primary Examiner* — Charles V Hicks
(74) *Attorney, Agent, or Firm* — McClure and Associates, PLLC (57) ABSTRACT

An apparatus, comprising a processor, a memory including computer program code, the memory and the computer program code configured to, working with the processor, cause the apparatus to perform at least the following: receiving a first image, recognizing at least part of the first image as a command receiver, recognizing at least part of the first image as an input article, determining that at least part of the input article is associated with at least part of the command receiver, and causing display of a guidance associated with the command receiver is disclosed.

20 Claims, 6 Drawing Sheets

METHOD AND APPARATUS FOR DETERMINING INPUT

RELATED APPLICATION

This application was originally filed as PCT Application No. PCT/CN2010/074001 filed Jun. 17, 2010.

TECHNICAL FIELD

The present application relates generally to determining input.

BACKGROUND

Electronic devices have seen a large market growth. There are many electronic devices that may receive input in various ways.

SUMMARY

Various aspects of examples of the invention are set out in the claims.

An apparatus, comprising a processor, memory including computer program code, the memory and the computer program code configured to, working with the processor, cause the apparatus to perform at least the following: receiving a first image, recognizing at least part of the first image as a command receiver, recognizing at least part of the first image as an input article, determining that at least part of the input article is associated with at least part of the command receiver, and causing display of a guidance associated with the command receiver is disclosed.

A method comprising receiving a first image, recognizing at least part of the first image as a command receiver, recognizing at least part of the first image as an input article, determining that at least part of the input article is associated with at least part of the command receiver, and causing display of a guidance associated with the command receiver is disclosed.

A computer-readable medium encoded with instructions that, when executed by a computer, perform: receiving a first image, recognizing at least part of the first image as a command receiver, recognizing at least part of the first image as an input article, determining that at least part of the input article is associated with at least part of the command receiver, and causing display of a guidance associated with the command receiver is disclosed.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

An embodiment of the invention and its potential advantages are understood by referring to FIGS. 1 through 5 of the drawings.

Figure 1A:
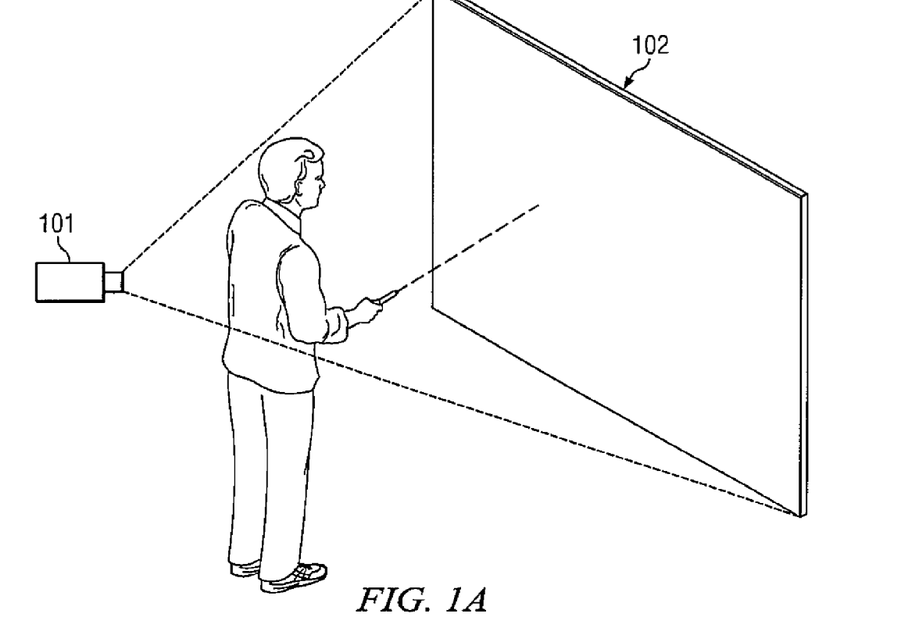
FIGS. 1A-1C are diagrams illustrating examples of circumstances where a user may benefit from one or more example embodiment.
Figure 1B:
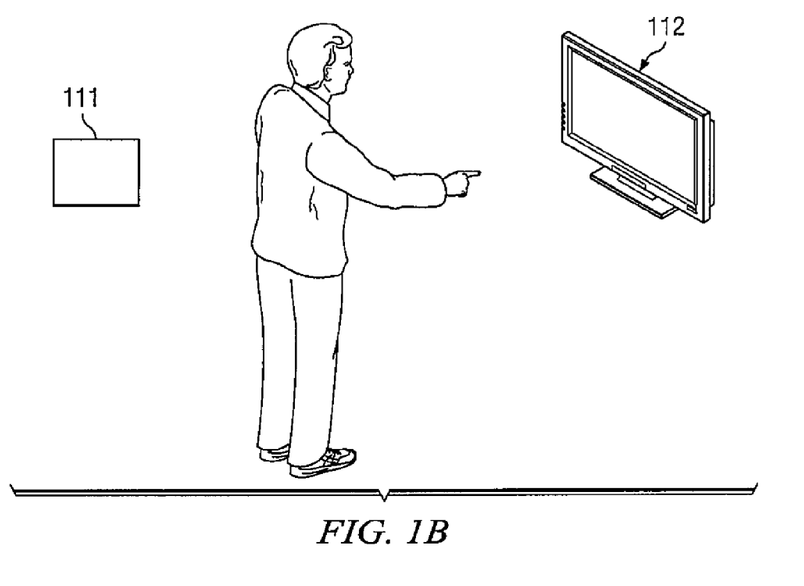
Figure 1C:
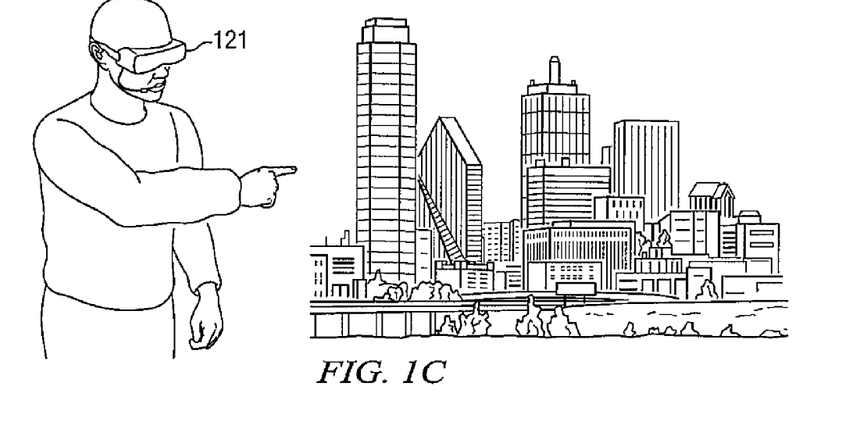

FIGS. 1A-1C are diagrams illustrating examples of circumstances where a user may benefit from one or more example embodiment. The examples of FIGS. 1A-1C are merely examples and do not limit the scope of the claims. For example, arrangement, position, size, orientation, and/or the like, may vary with respect to camera, user, display, projection, objects, and/or the like.

There are many circumstances where interaction between a user and a computer spans a large area. For example, computers are ubiquitously used for presentations, group interaction, meetings, advertizing, etc. In addition, augmented reality provides the universe itself as an area of computer interaction. Under such circumstances, the presentation of information from the computer may comprise a large surface, such as a presentation screen, a large-screen monitor, etc.

In an example embodiment, a user invokes computer action by providing an indication to a computer, such that the indication is associated with an element provided by the computer to the user. The action may relate to the computer selecting an object, running a program, editing information, providing a setting, calling a computer program function, and/or the like. For example, a user may provide an indication to the computer that the user desires to perform an operation on a program, such as running the program. In such an example, the user may point to an icon associated with the program to indicate a desire to run the program.

Figure 5:
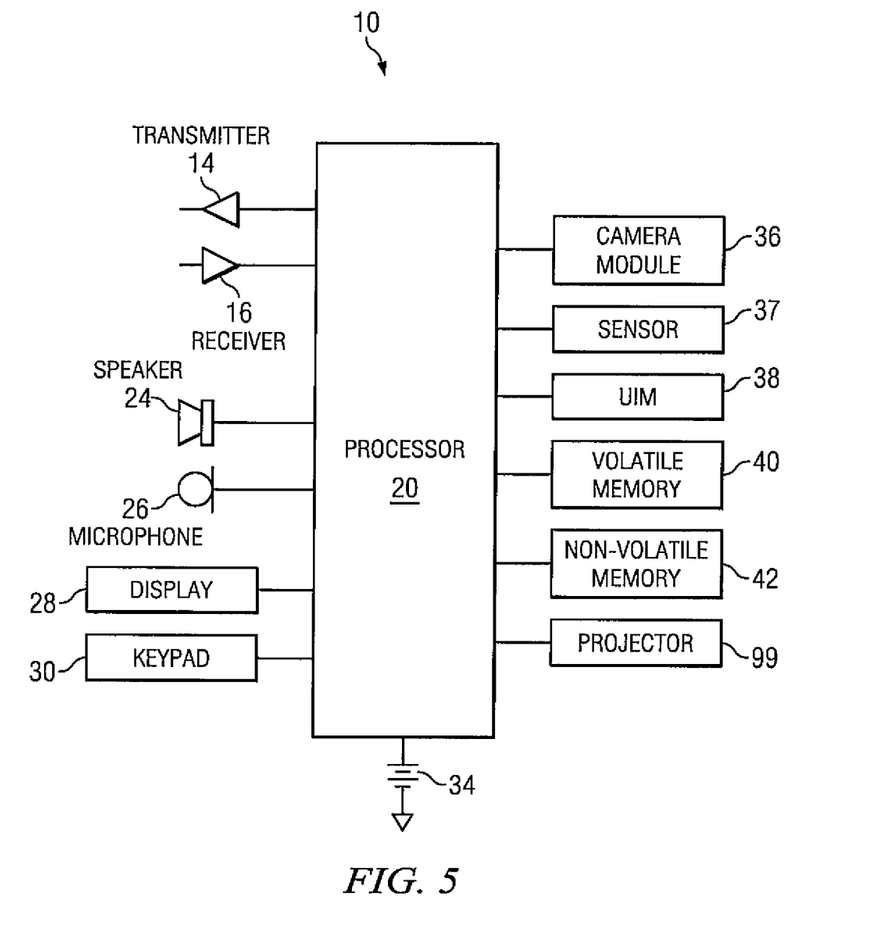
FIG. 5 is a block diagram showing an apparatus, such as an electronic device 10, according to at least one example embodiment.

In an example embodiment, a computer utilizes a camera, such as camera module 36 of FIG. 5, to acquire user information for input. For example, the camera may obtain one or more images associated with a user performing input. Under such circumstances, the user may be performing input in relation to information that the computer recognizes, such as an object, an image, etc. The computer may utilize the camera to receive one or more images, video, and/or the like, that indicate user input. The camera may be a part of the computer, similar as described with reference to device 10 of FIG. 5, external to the computer, and/or the like. Furthermore, the apparatus may utilize one or more cameras.

The camera may be positioned so that it may capture information presented by the computer, such as on a display, a projection screen, and/or the like. The camera may be positioned so that it may capture information that is not presented by the computer, such as a building, a poster, a landmark, etc. The camera may also be positioned so that it may capture an action by the user, such as pointing, moving, and/or the like.

FIG. 1A illustrates an example of user interaction associated with a projection according to an example embodiment. In the example of FIG. 1A apparatus 101 comprises a camera, such as camera module 36 of FIG. 5, and a projector, such as projector 99 of FIG. 5. However, in other embodiments, the camera and/or the projector may be external to the apparatus. In the example of FIG. 1A, the apparatus causes display of information using the projector to project the information onto projection surface 102. The projection surface may relate to a surface capable of sufficiently reflecting the projection to allow the projection to be seen, such as a wall, screen, board, and/or the like. The apparatus may receive an image from the camera regarding the user interaction with the projected information, similar as described with reference to FIGS. 2A-2I.

FIG. 1B illustrates user interaction associated with a display according to an example embodiment. In the example of FIG. 1B apparatus 111 comprises a camera, such as camera module 36 of FIG. 5. However, in other embodiments, the camera may be external to the apparatus. In the example of FIG. 1B, the apparatus causes display of information on display 112. The display may relate to a television, monitor, and/or the like. The apparatus may receive an image from the camera regarding the user interaction with the displayed information, similar as described with reference to FIGS. 2A-2I.

FIG. 1C illustrates user interaction associated with augmented reality according to an example embodiment. In the example of FIG. 1C, apparatus 121 comprises a display, such as display 28 of FIG. 5, and a camera, such as camera module 36 of FIG. 5. In the example of FIG. 1C, the apparatus causes display of information on the display. The display may be oriented directly in front of the user's eyes. The display may be opaque, such that the user's view beyond the display is obscured, or non-opaque such that the user may simultaneously view the display and objects beyond the display. In the example, of FIG. 1C, the apparatus receives one or more images of objects around the user as well as one or more images regarding user interaction with displayed information, similar as described with reference to FIGS. 2A-2I.

FIGS. 2A-2I are diagrams illustrating examples of command receivers, input articles, and/or guidance according to at least one example embodiment. The examples of FIGS. 2A-2I are merely examples and do not limit the scope of the claims. For example, command receivers, guidances, input articles, and/or the like may vary.

In an example embodiment, the computer provides a command receiver to a user to facilitate interaction. A command receiver relates to an element, visualization, representation, and/or the like, that a user may associate with an operation, a file, a structure, a program, information, and/or the like. The user may perform input associated with the command receiver to initiate an action on the computer, similar as described with reference to FIGS. 1A-1C. For example, the command receiver may relate to an image that the apparatus causes to be displayed. In another example, the command receiver may relate to an object that the apparatus associates with a command receiver, such as a landmark.

In an example embodiment, the user communicates input associated with a command receiver by using an input article. An input article may relate to a hand, a pointing gesture, a pointer, a reflection of a laser pointer, an arm, and/or the like. In an example embodiment, the apparatus receives an image that comprises an image of the input article. The apparatus may recognize the input article and associate the input article with a command receiver.

There may be inaccuracy in camera-based user interaction with a computer. For example, the user may shake, may have difficulty accurately communicating position, may have difficulty accurately communicating a motion, and/or the like. In another example, the computer may have difficulty interpreting input position, input motion, and/or the like. Therefore, there may be circumstances where the apparatus may inappropriately perform an action associated with a command receiver. Under such circumstances, the apparatus may utilize verification to reduce likelihood of such improper action.

The apparatus may reduce likelihood of improper command receiver action by increasing the complexity of the input associated with command receiver action. However, the user may encounter difficulty performing and/or remembering increased complexity input. Under such circumstances, the apparatus may provide a guidance for the input to be associated with command receiver action. The guidance may relate to one or more images, animations, and/or the like. The guidance may relate to modification of information caused to be displayed, such as modification of one or more command receivers, modification of background, and/or the like. Furthermore, a user may benefit from the apparatus restricting display of the guidance to circumstances where the guidance is more likely to be helpful. For example, the user may benefit from restricting display of the guidance so that the guidance is shown when the apparatus has determined that at least part of the input article is associated with at least part of the command receiver.

The apparatus may determine that at least part of the input article is associated with at least part of the command receiver by determining that the position of the input article corresponds with at least part of position of the command receiver. For example, the apparatus may recognize at least part of an image as a command receiver and recognize at least part of the image as an input article that has a position at least partially coinciding with, or substantially near the command receiver. Determination that the input article is substantially near the command receiver may relate to determination that the input article is within a threshold distance from the command receiver, that the input article is closer to the command receiver than to a different command receiver, and/or the like. In an example embodiment, such determination comprises determining position of the input article and/or position of the command receiver.

In an example embodiment, the apparatus stores historical information associated with the input article. In such an example, the apparatus may utilize the historical information to determine that at least part of the input article is associated with at least part of the command receiver. For example, an apparatus may utilize historical information associated with the input article to identify a gesture associated with a command receiver. Such a gesture may relate to an input article remaining at a position beyond a threshold time, an input article performing a predetermined movement, and/or the like.

In an example embodiment, the apparatus provides the user with feedback as the user performs input in accordance with the guidance. For example, the apparatus may modify the guidance as the user performs input that corresponds to at least part of the guidance.

In an example embodiment, the apparatus recognizes at least part of the first image as a command receiver based, at least in part, on information associated with the display of the command receiver. For example, the apparatus may utilize information related to its knowledge of relative positioning of command receivers that the apparatus caused to be displayed, such as by using pre-parsing display information. In another example, the apparatus may compare at least part of the image to the image the apparatus caused to be displayed in association with the command receiver.

In an example embodiment, the apparatus determines that at least part of the input article is associated with at least part of the command receiver based, at least in part, on information associated with the display of the command receiver. For example, the apparatus may utilize knowledge of an image that the apparatus caused to be displayed in association with the command receiver to determine that at least part of the input article modifies and/or obscures at least part of the image associated with the command receiver.

In an example embodiment, the apparatus utilizes a finite state machine to determine whether to perform an action associated with the command receiver, whether to modify the guidance, whether to terminate display of the guidance, and/or the like. For example, the apparatus may utilize a finite state machine so that a multiple input guidance is properly received, similar as described with reference to FIGS. 2C-2F. The apparatus may terminate display of the guidance based on substantial deviation from the command receiver, substantial deviation from the guidance, and/or the like. Substantial deviation may relate to positional deviation beyond a threshold distance, deviation from a gesture beyond a threshold deviation, and/or the like. The apparatus may terminate display of the guidance based, at least in part, on passage of time. For example, the apparatus may terminate display of guidance based upon determination that the input article has not performed the input associated with the guidance within a threshold time. In another example, the apparatus may terminate display of the guidance based, at least in part, on determination that the input article has not progressed performance of the input associated with the guidance within a threshold of time.

Figure 2A:
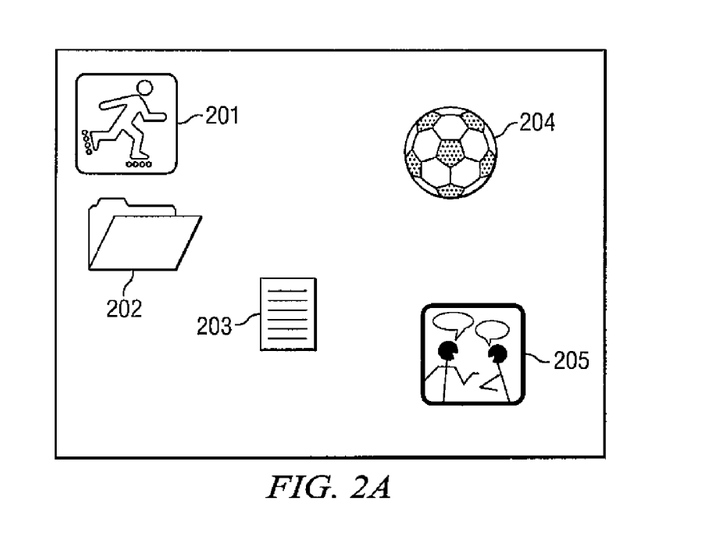
FIGS. 2A-2I are diagrams illustrating examples of command receivers, input articles, and/or guidance according to at least one example embodiment.

FIG. 2A illustrates examples of command receivers in accordance with an example embodiment. In the example of FIG. 2A, command receivers 201-205 may relate to icons, images, parts of images, and/or the like.

Figure 2B:
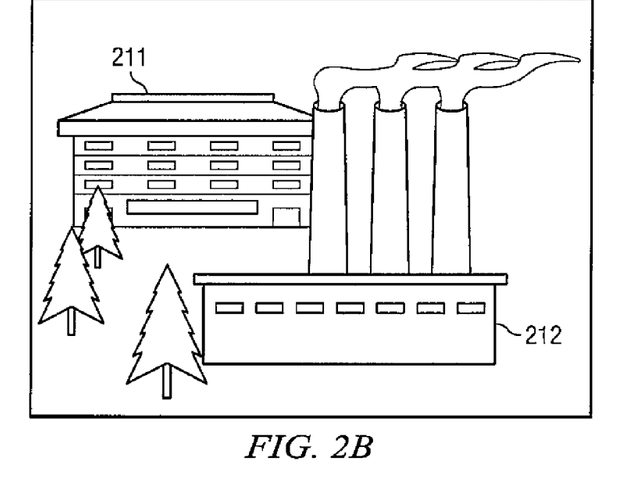

FIG. 2B illustrates further examples of command receivers in accordance with an example embodiment. In the example of FIG. 2B, command receivers 211 and 212 may relate to icons, images, parts of images, and/or the like. In an augmented reality apparatus, command receivers 211 and 212 may relate to buildings recognized by the apparatus as being associated with command receivers, such as buildings the apparatus may be able to provide information for, such as additional images, historical information, and/or the like.

FIGS. 2C-2F illustrate input article 222 and guidance in association with command receiver 221 according to an example embodiment. In the example of FIGS. 2C-2F, guidance relates to three positions. The individual figures of FIGS. 2C-2F may relate to successive images. The successive images may relate to separately captured images, and/or images from a video. Even though the examples of FIGS. 2C-2F demonstrate guidance modification related to terminating display of at least part of the guidance, modification of the guidance may vary. For example, the guidance may be modified based on size, color, transparency, shading, and/or the like. In an example embodiment, the modification indicates that the input article corresponded with at least part of the guidance.

Figure 2C:
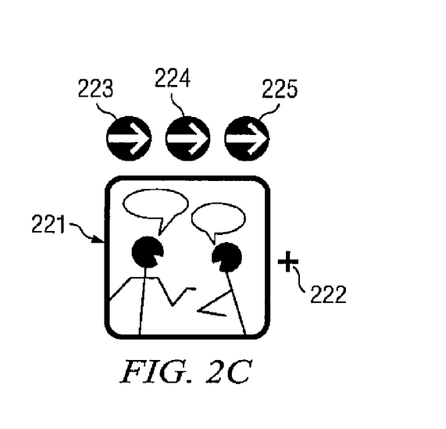

FIG. 2C illustrates input article 222 and guidance in association with command receiver 221 according to an example embodiment. In the example of FIG. 2C, guidance comprises position indicators 223-225. Even though the position indicators imply sequential order by way of directional indication, position indicators may vary in sequential implication, such as by denoting numerical order, animation, alphabetical order, and/or the like, An apparatus may cause display of the guidance in response to determining that at least part of input article corresponds with at least part of the command receiver.

Figure 2D:
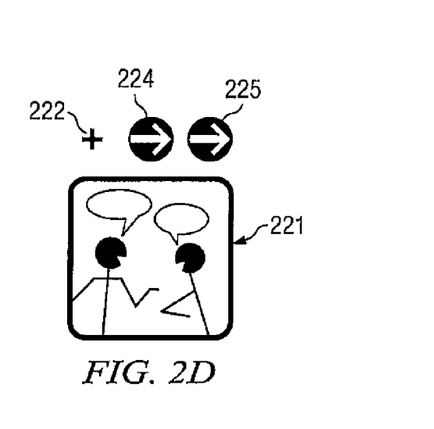

FIG. 2D illustrates input article 222 and modified guidance in association with command receiver 221 according to an example embodiment. In the example of FIG. 2D, position of input article 222 corresponds with part of the guidance, position indicator 223. The example of FIG. 2D illustrates the apparatus modifying the guidance by terminating display of position indicator 223. The apparatus may modify the guidance in response to a determination that at least part of the input article corresponds with at least part of position indicator 223.

Figure 2E:
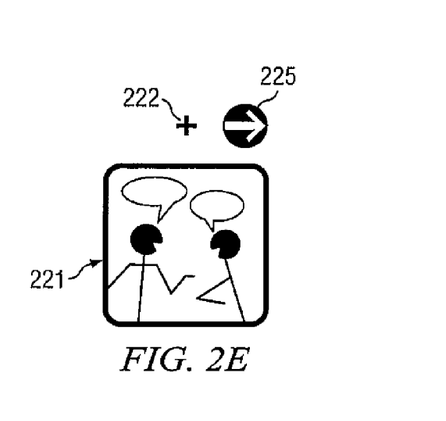

FIG. 2E illustrates input article 222 and further modified guidance in association with command receiver 221 according to an example embodiment. In the example of FIG. 2E, position of input article 222 corresponds with part of the guidance, position indicator 224. The example of FIG. 2E illustrates the apparatus modifying the guidance by terminating display of position indicator 224. The apparatus may modify the guidance in response to a determination that at least part of the input article corresponds with at least part of position indicator 224.

Figure 2F:
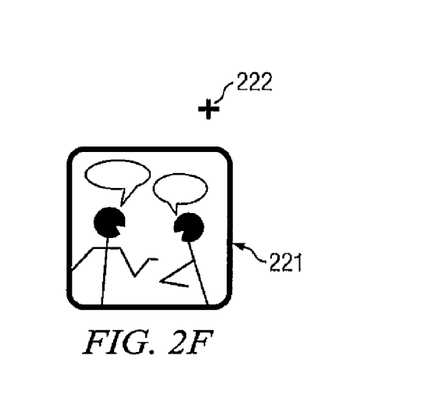

FIG. 2F illustrates input article 222 and yet further modified guidance in association with command receiver 221 according to an example embodiment. In the example of FIG. 2F, position of input article 222 corresponds with part of the guidance, position indicator 225. The example of FIG. 2F illustrates the apparatus modifying the guidance by terminating display of position indicator 225. The apparatus may modify the guidance in response to a determination that at least part of the input article corresponds with at least part of position indicator 225. Upon completion of input corresponding to the guidance, the apparatus may perform an action associated with the command receiver.

Figure 2G:
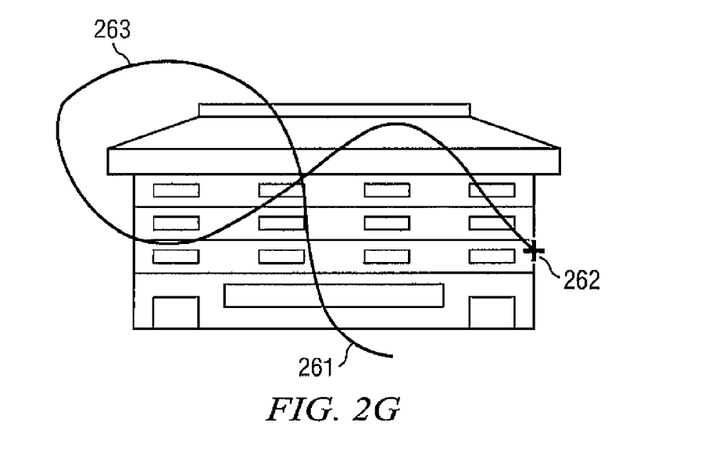
Figure 2H:
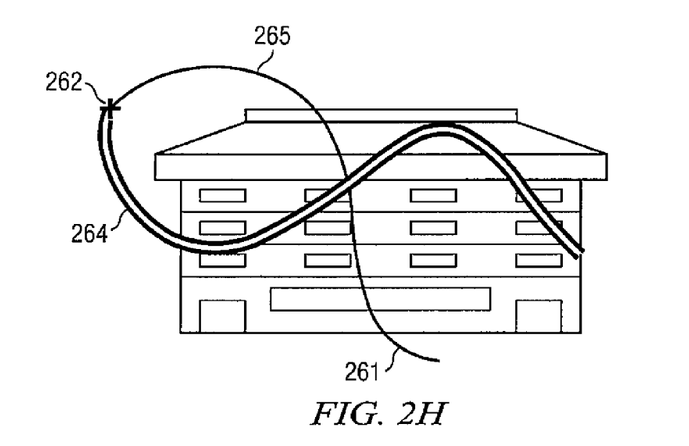
Figure 2I:
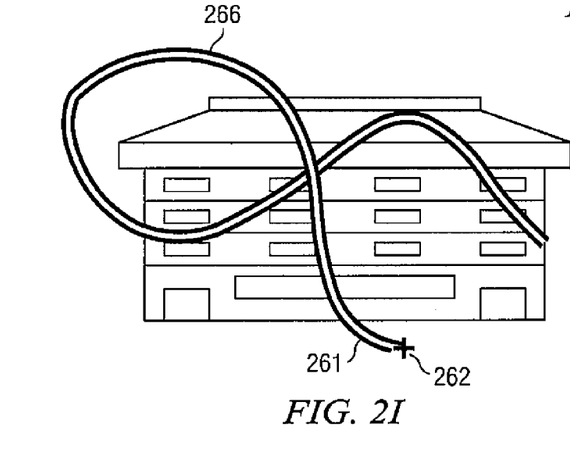

FIGS. 2G-2I illustrate guidance and input article 262 in association with command receiver 261 according to an example embodiment. In the example of FIGS. 2G-2I, guidance relates to three positions. The individual figures of FIGS. 2G-2I may relate to successive images. The successive images may relate to separately captured images, and/or images from a video. Even though the examples of FIGS. 2G-2I demonstrate guidance modification related to changing thickness and shading pattern of at least part of the guidance, modification of the guidance may vary. For example, the guidance may be modified based on size, color, transparency, shading, and/or the like, such that the modification indicates that the input article corresponded with at least part of the guidance.

FIG. 2G illustrates guidance 263 and input article 262 in association with command receiver 261 according to an example embodiment. In the example of FIG. 2G, guidance relates to movement of the input article. Even though the movement indicated by guidance 263 crosses over itself and substantially encompasses the breadth and height of command receiver 261, guidance may vary by size, shape, orientation, and/or the like. An apparatus may cause display of the guidance in response to determining that at least part of input article corresponds with at least part of the command receiver.

FIG. 2H illustrates input article 262 and modified guidance in association with command receiver 261 according to an example embodiment. The modified guidance comprises guidance 264, which indicates part of the guidance corresponding to movement performed by the input article, and guidance 265, which indicates movement yet to be performed by the input article. In the example of FIG. 2H, position of input article 262 corresponds with part of the guidance, denoted by the transition between guidance 264 and guidance 265. The apparatus may modify the guidance in response to a determination that at least part of the input article corresponds with at least part of the guidance.

FIG. 2I illustrates modified guidance 266 and input article 262 in association with command receiver 261 according to an example embodiment. Modified guidance 266 indicates that input associated with the guidance was performed by the input article. In the example of FIG. 2I, position of input article 262 corresponds with part of guidance 266. The apparatus may modify the guidance in response to a determination that at least part of the input article corresponds with at least part of the guidance. Upon completion of input corresponding to the guidance, the apparatus may perform an action associated with the command receiver.

Figure 3:
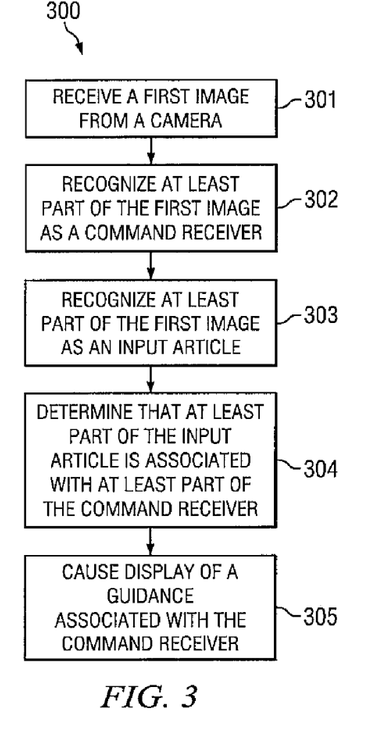
FIG. 3 is a flow diagram showing a set of operations for determining input according to at least one example embodiment.

FIG. 3 is a flow diagram showing a set of operations 300 for determining input according to at least one example embodiment. An apparatus, for example electronic device 10 of FIG. 5 or a portion thereof, may utilize the set of operations 300. The apparatus may comprise means, including, for example processor 20 of FIG. 5, for performing the all or part of the operations of FIG. 3. In an example embodiment, an apparatus, for example device 10 of FIG. 5, is transformed by having memory, for example memory 42 of FIG. 5, comprising computer code configured to, working with a processor, for example processor 20 of FIG. 5, cause the apparatus to perform set of operations 300.

At block 301, the apparatus receives a first image from a camera. The receiving, first image, and camera may be similar as described with reference to FIGS. 1A-1C.

At block 302, the apparatus recognizes at least part of the first image as a command receiver. The recognition and command receiver may be similar as described with reference to FIGS. 2A-2I.

At block 303, the apparatus recognizes at least part of the first image as an input article. The recognition and input article may be similar as described with reference to FIGS. 2A-2I.

At block 304, the apparatus determines that at least part of the input article is associated with at least part of the command receiver. The determination and association may be similar as described with reference to FIGS. 2A-2I.

At block 305, the apparatus causes display of a guidance associated with the command receiver. The causing of display may be similar as described with reference to FIGS. 1A-1C and FIGS. 2A-2I. The guidance may be similar as described with reference to FIGS. 2A-2I.

Figure 4:
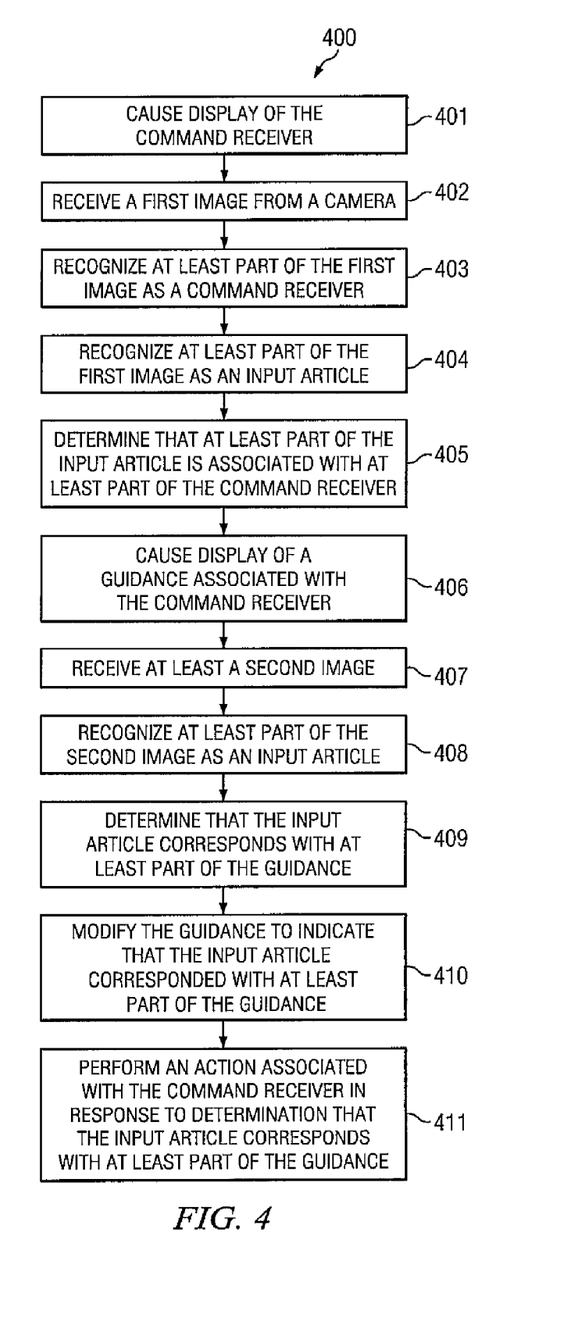
FIG. 4 is a flow diagram showing another set of operations for determining input according to at least one example embodiment.

FIG. 4 is a flow diagram showing a set of operations 400 for determining input according to at least one example embodiment. An apparatus, for example electronic device 10 of FIG. 5 or a portion thereof, may utilize the set of operations 400. The apparatus may comprise means, including, for example processor 20 of FIG. 5, for performing the all or part of the operations of FIG. 4. In an example embodiment, an apparatus, for example device 10 of FIG. 5, is transformed by having memory, for example memory 42 of FIG. 5, comprising computer code configured to, working with a processor, for example processor 20 of FIG. 5, cause the apparatus to perform set of operations 400.

At block 401, the apparatus causes display of the command receiver, similar as described with reference to FIGS. 1A-1C and FIGS. 2A-2I.

At block 402, the apparatus receives a first image from a camera, similar as described with reference to block 301 of FIG. 3.

At block 403, the apparatus recognizes at least part of the first image as a command receiver, similar as described with reference to block 302 of FIG. 3.

At block 404, the apparatus recognizes at least part of the first image as an input article, similar as described with reference to block 303 of FIG. 3.

At block 405, the apparatus determines that at least part of the input article is associated with at least part of the command receiver, similar as described with reference to block 304 of FIG. 3.

At block 406, the apparatus causes display of a guidance associated with the command receiver, similar as described with reference to block 305 of FIG. 3.

At block 407, the apparatus receives at least a second image. The receiving and second image are similar as described with reference to FIGS. 1A-1C and FIGS. 2A-2I.

At block 408, the apparatus recognizes at least part of the second image as an input article, similar as described with reference to FIGS. 2A-2I.

At block 409, the apparatus determines that the input article corresponds with at least part of the guidance. The determination is similar as described with reference to FIGS. 2A-2I.

At block 410, the apparatus modifies the guidance to indicate that the input article corresponded with at least part of the guidance, similar as described with reference to FIGS. 2A-2I.

At block 411, the apparatus perform an action associated with the command receiver in response to determination that the input article corresponds with at least part of the guidance, similar as described with reference to FIGS. 1A-1C and FIGS. 2A-2I.

FIG. 5 is a block diagram showing an apparatus, such as an electronic device 10, according to at least one example embodiment. It should be understood, however, that an electronic device as illustrated and hereinafter described is merely illustrative of an electronic device that could benefit from embodiments of the invention and, therefore, should not be taken to limit the scope of the invention. While one embodiment of the electronic device 10 is illustrated and will be hereinafter described for purposes of example, other types of electronic devices, such as, but not limited to, portable digital assistants (PDAs), pagers, mobile computers, desktop computers, televisions, gaming devices, laptop computers, media players, cameras, video recorders, global positioning system (GPS) devices and other types of electronic systems, may readily employ embodiments of the invention. Moreover, the apparatus of an example embodiment need not be the entire electronic device, but may be a component or group of components of the electronic device in other example embodiments.

Furthermore, devices may readily employ embodiments of the invention regardless of their intent to provide mobility. In this regard, even though embodiments of the invention are described in conjunction with mobile communications applications, it should be understood that embodiments of the invention may be utilized in conjunction with a variety of other applications, both in the mobile communications industries and outside of the mobile communications industries.

The electronic device 10 may comprise an antenna, (or multiple antennae), a wired connector, and/or the like in operable communication with a transmitter 14 and a receiver 16. The electronic device 10 may further comprise a processor 20 or other processing circuitry that provides signals to and receives signals from the transmitter 14 and receiver 16, respectively. The signals may comprise signaling information in accordance with a communications interface standard, user speech, received data, user generated data, and/or the like. The electronic device 10 may operate with one or more air interface standards, communication protocols, modulation types, and access types. By way of illustration, the electronic device 10 may operate in accordance with any of a number of first, second, third and/or fourth-generation communication protocols or the like. For example, the electronic device 10 may operate in accordance with wireline protocols, such as Ethernet, digital subscriber line (DSL), asynchronous transfer mode (ATM), second-generation (2G) wireless communication protocols IS-56 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), or with fourth-generation (4G) wireless communication protocols, wireless networking protocols, such as 802.11, short-range wireless protocols, such as Bluetooth, and/or the like.

As used in this application, the term 'circuitry' refers to all of the following: hardware-only implementations (such as implementations in only analog and/or digital circuitry) and to combinations of circuits and software and/or firmware such as to a combination of processor(s) or portions of processor(s)/software including digital signal processor(s), software, and memory(ies) that work together to cause an apparatus, such as a mobile phone or server, to perform various functions and to circuits, such as a microprocessor(s) or portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor, multiple processors, or portion of a processor and its (or their) accompanying software and/or firmware. The term "circuitry" would also cover, for example, a baseband integrated circuit or applications processor integrated circuit for a mobile phone or a similar integrated circuit in a cellular network device or other network device.

Processor 20 may comprise means, such as circuitry, for implementing audio, video, communication, navigation, logic functions, and/or the like, as well as for implementing embodiments of the invention including, for example, one or more of the functions described in conjunction with FIGS. 1-5. For example, processor 20 may comprise means, such as a digital signal processor device, a microprocessor device, various analog to digital converters, digital to analog converters, processing circuitry and other support circuits, for performing various functions including, for example, one or more of the functions described in conjunction with FIGS. 1-5. The apparatus may perform control and signal processing functions of the electronic device 10 among these devices according to their respective capabilities. The processor 20 thus may comprise the functionality to encode and interleave message and data prior to modulation and transmission. The processor 20 may additionally comprise an internal voice coder, and may comprise an internal data modem. Further, the processor 20 may comprise functionality to operate one or more software programs, which may be stored in memory and which may, among other things, cause the processor 20 to implement at least one embodiment including, for example, one or more of the functions described in conjunction with FIGS. 1-5. For example, the processor 20 may operate a connectivity program, such as a conventional internet browser. The connectivity program may allow the electronic device 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic device 10 may comprise a user interface for providing output and/or receiving input. The electronic device 10 may comprise an output device such as a ringer, a conventional earphone and/or speaker 24, a microphone 26, a display 28, and/or a user input interface, which are coupled to the processor 20. The user input interface, which allows the electronic device 10 to receive data, may comprise means, such as one or more devices that may allow the electronic device 10 to receive data, such as a keypad 30, a touch display, for example if display 28 comprises touch capability, and/or the like. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic device 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. Display 28 may display two-dimensional information, three-dimensional information and/or the like.

In embodiments including the keypad 30, the keypad 30 may comprise numeric (for example, 0-9) keys, symbol keys (for example, #, *), alphabetic keys, and/or the like for operating the electronic device 10. For example, the keypad 30 may comprise a conventional QWERTY keypad arrangement. The keypad 30 may also comprise various soft keys with associated functions. In addition, or alternatively, the electronic device 10 may comprise an interface device such as a joystick or other user input interface. The electronic device 10 further comprises a battery 34, such as a vibrating battery pack, for powering various circuits that are required to operate the electronic device 10, as well as optionally providing mechanical vibration as a detectable output.

In an example embodiment, the electronic device 10 comprises a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may comprise a digital camera which may form a digital image file from a captured image. As such, the camera module 36 may comprise hardware, such as a lens or other optical component(s), and/or software necessary for creating a digital image file from a captured image. Alternatively, the camera module 36 may comprise only the hardware for viewing an image, while a memory device of the electronic device 10 stores instructions for execution by the processor 20 in the form of software for creating a digital image file from a captured image. In an example embodiment, the camera module 36 may further comprise a processing element such as a co-processor that assists the processor 20 in processing image data and an encoder and/or decoder for compressing and/or decompressing image data. The encoder and/or decoder may encode and/or decode according to a standard format, for example, a Joint Photographic Experts Group (JPEG) standard format.

The electronic device 10 may comprise one or more user identity modules (UIM) 38. The UIM may comprise information stored in memory of electronic device 10, a part of electronic device 10, a device coupled with electronic device 10, and/or the like. The UIM 38 may comprise a memory device having a built-in processor. The UIM 38 may comprise, for example, a subscriber identity module (SIM), a universal integrated circuit card (UICC), a universal subscriber identity module (USIM), a removable user identity module (R-UIM), and/or the like. The UIM 38 may store information elements related to a subscriber, an operator, a user account, and/or the like. For example, UIM 38 may store subscriber information, message information, contact information, security information, program information, and/or the like. Usage of one or more UIM 38 may be enabled and/or disabled. For example, electronic device 10 may enable usage of a first UIM and disable usage of a second UIM.

In an example embodiment, electronic device 10 comprises a single UIM 38. In such an embodiment, at least part of subscriber information may be stored on the UIM 38.

In another example embodiment, electronic device 10 comprises a plurality of UIM 38. For example, electronic device 10 may comprise two UIM 38 blocks. In such an example, electronic device 10 may utilize part of subscriber information of a first UIM 38 under some circumstances and part of subscriber information of a second UIM 38 under other circumstances. For example, electronic device 10 may enable usage of the first UIM 38 and disable usage of the second UIM 38. In another example, electronic device 10 may disable usage of the first UIM 38 and enable usage of the second UIM 38. In still another example, electronic device 10 may utilize subscriber information from the first UIM 38 and the second UIM 38.

Electronic device 10 may comprise a memory device including, in one embodiment, volatile memory 40, such as volatile Random Access Memory (RAM) including a cache area for the temporary storage of data. The electronic device 10 may also comprise other memory, for example, non-volatile memory 42, which may be embedded and/or may be removable. The non-volatile memory 42 may comprise an EEPROM, flash memory or the like. The memories may store any of a number of pieces of information, and data. The information and data may be used by the electronic device 10 to implement one or more functions of the electronic device 10, such as the functions described in conjunction with FIGS. 1-5. For example, the memories may comprise an identifier, such as an international mobile equipment identification (IMEI) code, which may uniquely identify the electronic device 10.

Electronic device 10 may comprise one or more sensor 37. Sensor 37 may comprise a light sensor, a proximity sensor, a motion sensor, a location sensor, and/or the like. For example, sensor 37 may comprise one or more light sensors at various locations on the device. In such an example, sensor 37 may provide sensor information indicating an amount of light perceived by one or more light sensors. Such light sensors may comprise a photovoltaic element, a photoresistive element, a charge coupled device (CCD), and/or the like. In another example, sensor 37 may comprise one or more proximity sensors at various locations on the device. In such an example, sensor 37 may provide sensor information indicating proximity of an object, a user, a part of a user, and/or the like, to the one or more proximity sensors. Such proximity sensors may comprise capacitive measurement, sonar measurement, radar measurement, and/or the like.

Electronic device 10 may comprise a projector 99. The projector may comprise a video projector, a movie projector, a slide projector, an overhead projector, and/or the like. If electronic device 10 comprises a display and a projector, the projector may be used instead of the display, be used in conjunction with the display, be used to cause display of different information than the display, and/or the like.

Although FIG. 5 illustrates an example of an electronic device that may utilize embodiments of the invention including those described and depicted, for example, in FIGS. 1-5, electronic device 10 of FIG. 5 is merely an example of a device that may utilize embodiments of the invention.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media. In the context of this document, a "computer-readable medium" may be any tangible media or means that can contain, or store the instructions for use by or in connection with an instruction execution system, apparatus, or device, such as a computer, with one example of a computer described and depicted in FIG. 5. A computer-readable medium may comprise a computer-readable storage medium that may be any tangible media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
a processor;
memory including computer program code, the memory and the computer program code configured to, working with the processor, cause the apparatus to perform at least the following:

cause display of a command receiver, the command receiver being a displayed visual element associated with invoking an action by the apparatus;
receive a first image;
recognize at least part of the first image as the command receiver;
recognize at least part of the first image as an input article, the input article being a physical implement for a user to communicate an input to the apparatus;
determine that at least part of the input article is within a threshold distance from the command receiver based, at least in part, on the first image;
cause display of a guidance proximate to the command receiver in response to the determination that at least part of the input article is within the threshold distance from the command receiver, the guidance being one or more images that indicates an input that causes the apparatus to perform the action associated with the command receiver; and
determine that at least part of the input article corresponds with at least part of the guidance;
perform the action associated with the command receiver based, at least in part, on the determination that at least part of the input article corresponds with at least part of the guidance.

2. The apparatus of claim 1, wherein the guidance is displayed at least one position.

3. The apparatus of claim 1, wherein the guidance indicates a movement.

4. The apparatus of claim 1, wherein the memory and the computer program code are further configured to, working with the processor, cause the apparatus to perform receiving at least a second image, recognizing at least part of the second image as the input article, and determining that at least part of the input article corresponds with at least part of the guidance.

5. The apparatus of claim 4, wherein the memory and the computer program code are further configured to, working with the processor, cause the apparatus to perform modifying the guidance to indicate that the input article corresponded with at least part of the guidance.

6. The apparatus of claim 4, wherein the second image is a video.

7. The apparatus of claim 1, wherein determining that at least part of the input article is within the threshold distance from the command receiver comprises determining a position of the input article.

8. The apparatus of claim 7, wherein determining that at least part of the input article is within the threshold distance from the command receiver comprises determining that the position of the input article corresponds with at least part of the command receiver.

9. The apparatus of claim 1, wherein recognizing at least part of the first image as a command receiver is based, at least in part, on information associated with the display of the command receiver.

10. The apparatus of claim 1, wherein determining that at least part of the input article is within the threshold distance from the command receiver is based, at least in part, on information associated with the display of the command receiver.

11. The apparatus of claim 1, further comprising a camera, wherein the first image is received from the camera.

12. The apparatus of claim 1, further comprising a projector, wherein the causing of display is projection by the projector.

13. The apparatus of claim 1, further comprising a display, wherein the causing of display is displaying on the display.

14. The apparatus of claim 1, wherein the apparatus is a mobile device.

15. The apparatus of claim 1, wherein determining that at least part of the input article is within the threshold distance from the command receiver comprises utilization of historical input article information.

16. A method, comprising:
causing display of a command receiver, the command receiver being a displayed visual element associated with invoking an action by the apparatus;
receiving a first image;
recognizing at least part of the first image as the command receiver;
recognizing at least part of the first image as an input article, the input article being a physical implement for a user to communicate an input to the apparatus;
determining that at least part of the input article is within a threshold distance from the command receiver based, at least in part, on the first image;
causing display of a guidance proximate to the command receiver in response to the determination that at least part of the input article is within the threshold distance from the command receiver, the guidance being one or more images that indicates an input that causes the apparatus to perform the action associated with the command receiver; and
determining that at least part of the input article corresponds with at least part of the guidance;
performing the action associated with the command receiver based, at least in part, on the determination that at least part of the input article corresponds with at least part of the guidance.

17. A tangible non-transitory computer-readable medium encoded with instructions that, when executed by a processor, cause an apparatus to perform:
causing display of a command receiver, the command receiver being a displayed visual element associated with invoking an action by the apparatus;
receiving a first image;
recognizing at least part of the first image as the command receiver;
recognizing at least part of the first image as an input article, the input article being a physical implement for a user to communicate an input to the apparatus;
determining that at least part of the input article is within a threshold distance from the command receiver based, at least in part, on the first image;
causing display of a guidance proximate to the command receiver in response to the determination that at least part of the input article is within the threshold distance from the command receiver, the guidance being one or more images that indicates an input that causes the apparatus to perform the action associated with the command receiver; and
determining that at least part of the input article corresponds with at least part of the guidance;
performing the action associated with the command receiver based, at least in part, on the determination that at least part of the input article corresponds with at least part of the guidance.

18. The apparatus of claim 1, wherein the memory and the computer program code are further configured to, working with the processor, cause the apparatus to perform:
receive a second image;
recognize at least part of the second image as the command receiver;

recognize at least part of the second image as the input article;

determine that at the input article fails to correspond with at least part of the guidance for a threshold of time; and terminate display of the guidance in response to the determination that at the input article fails to correspond with at least part of the guidance for the threshold of time.

19. The method of claim 16, further comprising:

receiving a second image;

recognizing at least part of the second image as the command receiver;

recognizing at least part of the second image as the input article;

determining that at the input article fails to correspond with at least part of the guidance for a threshold of time; and terminating display of the guidance in response to the determination that at the input article fails to correspond with at least part of the guidance for the threshold of time.

20. The medium of claim 17, wherein computer-readable medium is further encoded with instructions that, when executed by the processor, cause an apparatus to perform:

receiving a second image;

recognizing at least part of the second image as the command receiver;

recognizing at least part of the second image as the input article;

determining that at the input article fails to correspond with at least part of the guidance for a threshold of time; and terminating display of the guidance in response to the determination that at the input article fails to correspond with at least part of the guidance for the threshold of time.

* * * * *